Oct. 28, 1924.

R. H. SMITH ET AL

ADHESIVE MATERIAL

Filed Jan. 13, 1923

1,513,191

UNITED STATES PATENT OFFICE.

ROY H. SMITH, OF ST. PAUL, AND RALPH B. BEAL, OF MINNEAPOLIS, MINNESOTA.

ADHESIVE MATERIAL.

Application filed January 13, 1923. Serial No. 612,499.

*To all whom it may concern:*

Be it known that we, ROY H. SMITH and RALPH B. BEAL, citizens of the United States, residing, respectively, at St. Paul and Minneapolis, in the counties of Ramsey and Hennepin and State of Minnesota, have invented certain new and useful Improvements in Adhesive Materials; and we do hereby declare the following to be a full, clear, and exact description of the invention, such as will enable others skilled in the art to which it appertains to make and use the same.

Our invention provides a low cost but highly efficient adhesive material especially adapted for use in making compo board from wooden slats and paper sheets, but adapted, nevertheless, for more general use.

The main and important elements of the adhesive material are sodium silicate, and dolomite or other dolomitic limestone. The proportions may be varied, but we have obtained the best results by using sodium silicate solution and finely pulverized dolomite thoroughly commingled in about equal proportions, measured in weight. Of course, both the sodium silicate and the dolomite may contain certain amounts of foreign materials, which, however, do not change the general character of the adhesive. Preferably, we use a pulverized dolomitic limestone known as dolomite.

Dolomite is a carbonate of calcium and magnesium (Ca,Mg)CO$_3$ in varying proportions and is found in abundance in most localities and is a very cheap or low cost material.

In practice, we have found that the cement made from sodium silicate and dolomite has great rigidity and permanence and will not deteriorate even when exposed for a long time to the elements, such as air or water. Moreover, this cement or adhesive has a very strong affinity for wood and all wood pulp or fibre substances such as fibre or paper board, wood strips, sawdust and the like, and when used as the binding element of a composition board of any of the above types, gives the board stiffness and rigidity and long life or permanency.

We have further found that by the use of dolomite, or other dolomitic limestones, either a cheaper or a more diluted sodium silicate may be employed and a higher grade adhesive produced than in the use of any other commercially available substance.

The accompanying drawings illustrate several of the many types of composition board in which the improved cement or adhesive may be used as the binding element.

Figure 1:
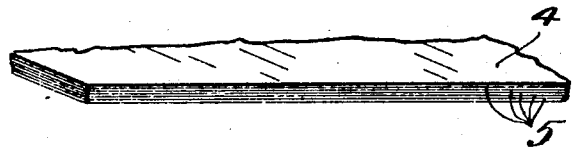

In Fig. 1, the composition board is made up of a plurality of layers or plies 4 of heavy coarse paper or fibre sheets permanently stuck together by adhesive material applied along the lines 5.

Figure 2:
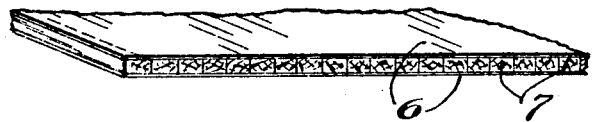

In Fig. 2, the composition board is made up of heavy paper sheets 6 and interposed wooden slats 7 stuck together by the adhesive applied between the joints or contacting surfaces in a well known manner of constructing commercial compo board.

Figure 3:
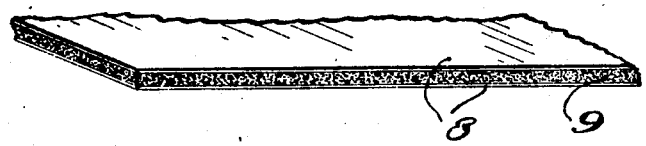

In Fig. 3, the composition board is made up of heavy paper facing sheets 8 and an interposed filler 9 of commingled sawdust and adhesive substance.

The composition board herein disclosed is made the subject-matter of an additional application Serial Number 688,188, filed of date January 24, 1924, and entitled "Composition board."

What we claim is:

1. An adhesive composition consisting of a silicate of soda and pulverized dolomitic limestone.

2. An adhesive composition consisting of silicate of soda and pulverized dolomitic limestone containing carbonate of calcium and carbonate of magnesium commingled in a solution of approximately equal amounts of each measured in weight.

In testimony whereof we affix our signatures.

ROY H. SMITH.
RALPH B. BEAL.